United States Patent
Zhang et al.

(10) Patent No.: US 10,810,499 B2
(45) Date of Patent: Oct. 20, 2020

(54) METHOD AND APPARATUS FOR RECOMMENDING SOCIAL MEDIA INFORMATION

(71) Applicant: Huawei Technologies Co., Ltd., Shenzhen, Guangdong (CN)

(72) Inventors: Jie Zhang, Shenzhen (CN); Yibo Zhang, Shenzhen (CN); Hang Li, Hongkong (HK)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 1173 days.

(21) Appl. No.: 14/991,651

(22) Filed: Jan. 8, 2016

(65) Prior Publication Data

US 2016/0117595 A1 Apr. 28, 2016

Related U.S. Application Data

(63) Continuation of application No. PCT/CN2014/070070, filed on Jan. 3, 2014.

(30) Foreign Application Priority Data

Jul. 11, 2013 (CN) .......................... 2013 1 0292232

(51) Int. Cl.
*G06N 5/04* (2006.01)
*G06N 20/00* (2019.01)
(Continued)

(52) U.S. Cl.
CPC .............. *G06N 5/04* (2013.01); *G06N 20/00* (2019.01); *G06Q 10/10* (2013.01); *G06Q 50/01* (2013.01)

(58) Field of Classification Search
None
See application file for complete search history.

(56) References Cited

U.S. PATENT DOCUMENTS 9,152,704 B2 * 10/2015 Oliver ..................... H04L 51/18
2009/0210381 A1 * 8/2009 Singh ..................... G06F 16/345
(Continued)

FOREIGN PATENT DOCUMENTS

CN 1967533 A 5/2007
CN 101583169 A 11/2009
(Continued)

OTHER PUBLICATIONS

Wang et al. "Unifying User-based and Item-based Collaborative Filtering Approaches by Similarity Fusion", SIGIR, 2006, pp. 501-508.*

*Primary Examiner* — Li Wu Chang
(74) *Attorney, Agent, or Firm* — Womble Bond Dickinson (US) LLP

(57) ABSTRACT

The present invention provides an information recommendation method and apparatus in a social media. An off-line procedure includes: determining a point of interest of a target user; selecting information related to the point of interest as an annotated corpus; and training an interest classification model of the target user by using the annotated corpus as a training sample. An on-line procedure includes: inputting to-be-recommended information to the interest classification model of the target user, so as to determine whether the to-be-recommended information tallies with an interest of the target user; and if the to-be-recommended information tallies with the interest of the target user, recommending the to-be-recommended information to the target user. According to the present invention, an effect of information recommendation in a social media can be improved.

19 Claims, 3 Drawing Sheets

(51) Int. Cl.
*G06Q 10/10* (2012.01)
*G06Q 50/00* (2012.01)

(56) References Cited

U.S. PATENT DOCUMENTS

| | | |
|---|---|---|
| 2010/0169160 A1 | 7/2010 | Wu et al. |
| 2011/0267955 A1 | 11/2011 | Dalsgaard |
| 2012/0054666 A1 | 3/2012 | Baird-Smith et al. |
| 2013/0054407 A1 | 2/2013 | Sabur |
| 2013/0171995 A1 | 7/2013 | Fujishiro et al. |

FOREIGN PATENT DOCUMENTS

| | | |
|---|---|---|
| CN | 101694652 A | 4/2010 |
| CN | 101819572 A | 9/2010 |
| CN | 101826114 A | 9/2010 |
| CN | 101873566 A | 10/2010 |
| CN | 102300279 A | 12/2011 |
| CN | 102413520 A | 4/2012 |
| CN | 102479202 A | 5/2012 |
| CN | 102647766 A | 8/2012 |
| CN | 102831199 A | 12/2012 |
| CN | 102938917 A | 2/2013 |
| CN | 103167569 A | 6/2013 |
| CN | 103702329 A | 4/2014 |
| CN | 1038103403 A | 5/2014 |
| EP | 2 549 423 A1 | 1/2013 |
| WO | 2011011958 A1 | 2/2011 |
| WO | 2013097063 A1 | 7/2013 |

\* cited by examiner

METHOD AND APPARATUS FOR RECOMMENDING SOCIAL MEDIA INFORMATION

CROSS-REFERENCE TO RELATED APPLICATIONS

This application is a continuation of International Application No. PCT/CN2014/070070, filed on Jan. 3, 2014, which claims priority to Chinese Patent Application No. 201310292232.4, filed on Jul. 11, 2013, both of which are hereby incorporated by reference in their entireties.

TECHNICAL FIELD

The present invention relates to the field of computer application technologies, and in particular, to an information recommendation method and apparatus in a social media.

BACKGROUND

With continuous development of network technologies, a total amount of information on the Internet expands at a rate of 50% every year. Among data generated in recent years, approximately 80% of the data is generated by individual users, particularly when they use websites or applications of a social media type. For example, 3 billion pieces of content are shared on Facebook every month, and Twitter information of 12 TB is generated every day. In addition, with popularity of mobile terminals, such an explosive trend does not have a tendency to be relieved. By the end of December 2012, more than 500 million users have registered with Sina Weibo, a quantity of daily active users is 46.29 million, 75% of the active users use a mobile client, and the daily active users stably account for 9-10% of total users in a whole year.

However, information explosion also brings about junk information overflow. To relieve a problem of junk information overflow caused by information explosion, various information recommendation systems emerge, and main recommendation technologies at present include collaborative filtering, spectrum analysis, and so on. The collaborative filtering is a content-based recommendation method, and the spectrum analysis is a diffusion-based recommendation method, but both methods have disadvantages when used in a social media, which are specifically as follows:

Because an amount of information in a social media is excessively huge, not all pieces of information can be tagged; but an existing recommendation technology is mainly a recommendation technology implemented based on an information tag, and information in social media has relatively strong time validity. As a result, much information that is valuable to users may be seldom reposted, commented on, or even read by people, and a recommendation effect is relatively poor.

SUMMARY

In view of this, the present invention provides an information recommendation method and apparatus in a social media, so as to improve an effect of information recommendation.

Specific technical solutions are as follows:

According to a first aspect, an embodiment of the present invention provides an information recommendation method in a social media, where the method includes an off-line procedure and an on-line procedure, where the off-line procedure includes:

S11: Determine a point of interest of a target user from historical operation information that is of the target user and in the social media;

S12: Select information related to the point of interest from the historical operation information that is of a quality user related to the point of interest and in the social media, as an annotated corpus; and S13: Train an interest classification model of the target user by using the annotated corpus as a training sample; and the on-line procedure includes:

S21: Acquire to-be-recommended information of the social media;

S22: Input the to-be-recommended information to the interest classification model of the target user, so as to determine whether the to-be-recommended information tallies with an interest of the target user; and S23: If the to-be-recommended information tallies with the interest of the target user, recommend the to-be-recommended information to the target user.

In a first possible implementation manner of the first aspect, the historical operation information includes at least one type of the following information:

posted information, favorited information, reposted information, comment information, and an annotated tag.

With reference to the first possible implementation manner of the first aspect, step S11 includes:

determining the point of interest of the user by using a tag that is annotated in the social media by the target user; or after word segmentation and stop word removal are separately performed on at least one type of the following information: posted information, favorited information, reposted information, and comment information of the target user, performing semantic clustering on an obtained word, and determining the point of interest of the target user by using a clustering result.

In a second possible implementation manner of the first aspect, a method for determining the quality user related to the point of interest includes:

selecting a user whose score meets a preset requirement from a user who has an association relationship with a predetermined seed user related to the point of interest, as the quality user, where the score is determined according to one of or any combination of the following factors: a degree of content matching between information that is posted, reposted, or self-described by a user and the point of interest, an activity degree of the user, impact of the user, and a spread range of user information.

With reference to the first aspect or the second possible implementation manner of the first aspect, step S12 specifically includes:

computing semantic similarity between the point of interest and each piece of information in the historical operation information of the quality user corresponding to the point of interest, and selecting information whose semantic similarity meets a preset similarity requirement as the information related to the point of interest.

In a third possible implementation manner of the first aspect, when the interest classification model is trained in step S13, a used feature includes a keyword of information, or further includes one of or any combination of the following factors: an information poster, a person followed by the information poster and a follower of the information poster, a quantity of comments on information, a quantity of reposts of information, and a quantity of favorites of information.

In a fourth possible implementation manner of the first aspect, the to-be-recommended information is real-time information, notification information, or promotion information.

According to a second aspect, an embodiment of the present invention provides an information recommendation apparatus in a social media, where the apparatus includes an off-line modeling unit and an on-line recommending unit, where the off-line modeling unit includes:

a point-of-interest determining subunit, configured to determine a point of interest of a target user from historical operation information that is of the target user and in the social media;

a corpus selecting subunit, configured to select information related to the point of interest from historical operation information that is of a quality user related to the point of interest and in the social media, as an annotated corpus; and a model training subunit, configured to train an interest classification model of the target user by using the annotated corpus as a training sample; and the on-line recommending unit includes:

an information acquiring subunit, configured to acquire to-be-recommended information of the social media;

an interest distinguishing subunit, configured to input the to-be-recommended information to the interest classification model of the target user, so as to determine whether the to-be-recommended information tallies with an interest of the target user; and an information recommending subunit, configured to: if the interest distinguishing subunit determines that the to-be-recommended information tallies with the interest of the target user, recommend the to-be-recommended information to the target user.

In a first possible implementation manner of the second aspect, the historical operation information includes at least one type of the following information:

posted information, favorited information, reposted information, comment information, and an annotated tag.

With reference to the first possible implementation manner of the second aspect, the point-of-interest determining subunit specifically executes the following: determining the point of interest of the user by using a tag that is annotated in the social media by the target user; or after word segmentation and stop word removal are separately performed on at least one type of the following information: posted information, favorited information, reposted information, and comment information of the target user, performing semantic clustering on an obtained word, and determining the point of interest of the target user by using a clustering result.

In a second possible implementation manner of the second aspect, the off-line modeling unit further includes:

a quality-user discovering subunit, configured to select a user whose score meets a preset requirement from a user who has an association relationship with a predetermined seed user related to the point of interest, as the quality user, where the score is determined according to one of or any combination of the following factors: a degree of content matching between information that is posted, reposted, or self-described by a user and the point of interest, an activity degree of the user, impact of the user, and a spread range of user information.

With reference to the second aspect or the second possible implementation manner of the second aspect, the corpus selecting subunit specifically executes the following: computing semantic similarity between the point of interest and each piece of information in the historical operation information of the quality user corresponding to the point of interest, and selecting information whose semantic similarity meets a preset similarity requirement as the information related to the point of interest.

In a third possible implementation manner of the second aspect, when the model training subunit trains the interest classification model, a used feature includes a keyword of information, or further includes one of or any combination of the following factors: an information poster, a person followed by the information poster and a follower of the information poster, a quantity of comments on information, a quantity of reposts of information, and a quantity of favorites of information.

In a fourth possible implementation manner of the second aspect, the to-be-recommended information is real-time information, notification information, or promotion information.

As can be seen from the foregoing technical solutions, according to the present invention, when an interest classification model of a target user is established, a manner of a manual annotation sample is no longer used; instead, manual annotation is replaced with a training sample that is obtained by determining a point of interest of the target user and by discovering information, related to the point of interest, in historical operation information of a quality user, so that a sample becomes more plentiful, and real-time information can be effectively recommended online by using the established interest classification model, thereby improving an effect of information recommendation in a social media.

DETAILED DESCRIPTION

To make the objectives, technical solutions, and advantages of the present invention clearer, the following describes the present invention in detail with reference to the accompanying drawings and the embodiments.

Figure 1:
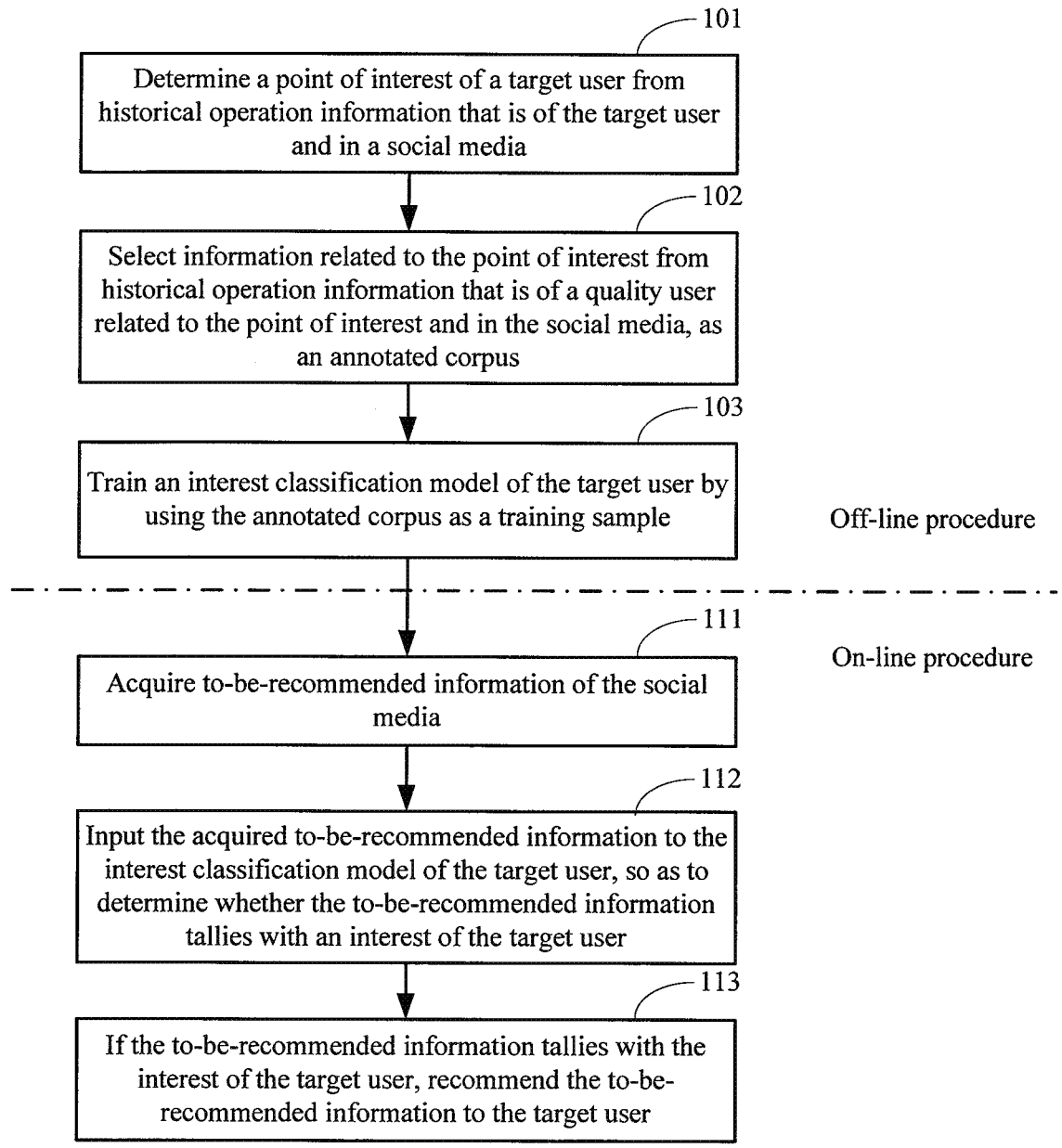
FIG. 1 is a main flowchart of an information recommendation method according to an embodiment of the present invention.

In the present invention, two stages are mainly included: an off-line procedure and an on-line procedure. FIG. 1 is a main flowchart of an information recommendation method according to an embodiment of the present invention. As shown in FIG. 1, the off-line procedure mainly includes the following steps:

Step 101: Determine a point of interest of a target user from historical operation information that is of the target user and in a social media.

Step 102: Select information related to the point of interest from historical operation information that is of a quality user related to the point of interest and in the social media, as an annotated corpus.

Step 103: Train an interest classification model of the target user by using the annotated corpus as a training sample.

The on-line procedure mainly includes the following steps:

Step 111: Acquire to-be-recommended information of the social media.

Step 112: Input the acquired to-be-recommended information to the interest classification model of the target user, so as to determine whether the to-be-recommended information tallies with an interest of the target user.

Step 113: If the to-be-recommended information tallies with the interest of the target user, recommend the to-be-recommended information to the target user.

It should be noted that, the foregoing off-line procedure and on-line procedure are two independent execution procedures. The on-line procedure is implemented based on the interest classification model established in the off-line procedure, and is generally embodied as a real-time or periodical procedure. The off-line procedure is used to establish and update (generally, an updating process is also embodied as the foregoing establishing process) the interest classification model, and is generally embodied as a periodical procedure.

Figure 2:
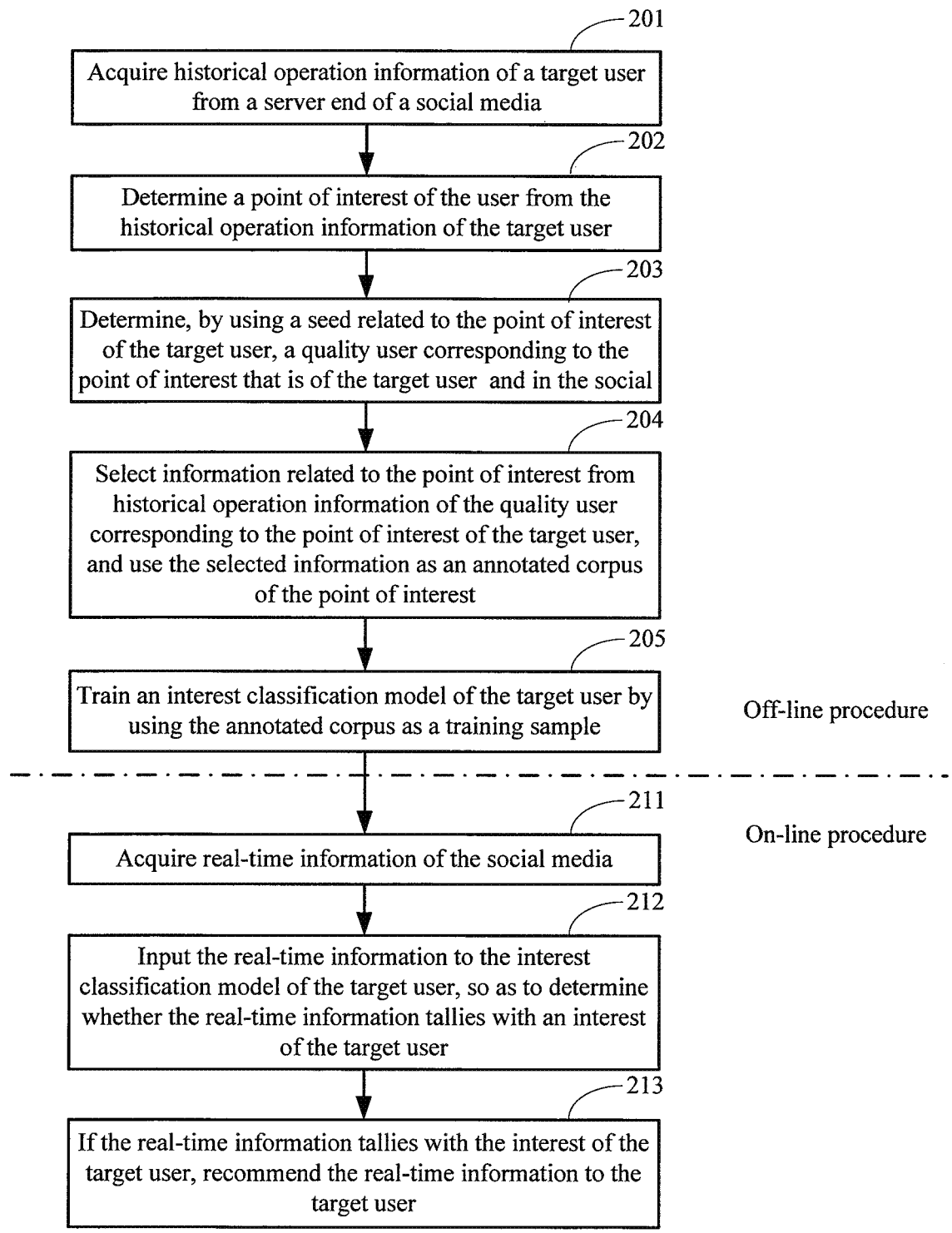
FIG. 2 is a detailed flowchart of an information recommendation method according to an embodiment of the present invention.

The following describes in detail, by using an embodiment, the method provided in the present invention. FIG. 2 is a detailed flowchart of an information recommendation method according to an embodiment of the present invention. Likewise, the method provided in this embodiment includes an off-line procedure and an on-line procedure. As shown in FIG. 2, the off-line procedure includes the following steps:

Step 201: Acquire historical operation information of a target user from a server end of a social media.

In this embodiment of the present invention, the target user may be a designated user in the social media, or may be all users in the social media. The off-line procedure is executed for each target user separately to establish an interest classification model of each target user.

The historical operation information of the target user may be acquired from the server end of the social media by using an API provided by the social media. The historical operation information may include but is not limited to information posted by the target user, information favorited by the target user, information reposted by the target user, and information commented on by the target user, a tag (tag) annotated by the target user, and the like.

Step 202: Determine a point of interest of the user from the historical operation information of the target user.

The point of interest is an expression that can embody content in which a user is interested and may refer to a field, a topic, an event, or even a keyword, and a granularity of the point of interest is not limited in this embodiment of the present invention. In this step, a manner for determining the point of interest of the user may be, but is not limited to, the following two manners:

A first manner is: determining the point of interest of the user by using a tag that is annotated in the social media by the target user. Generally, a function that enables the user to annotate a tag is provided in the social media for the user. For example, a user of Sina Weibo can make self-description by annotating a tag, with a main purpose of helping others know about the user and find persons of a similar type to follow or to be followed. Tags annotated by the user are generally related to a profession, a hobby, and the like of the user, and the tags reflect an interest of the user to a great extent. Therefore, the tag of the target user may be directly used to determine the point of interest of the user.

For example, in Sina Weibo, a user annotates "basketball", "intellectual property rights", and "Jay Chou", and then, when a point of interest of the user is determined, these tags may be directly used as the point of interest of the user, that is, "basketball", "intellectual property rights", and "Jay Chou" are directly used as the point of interest of the user. Types to which these tags belong may also be used as the point of interest of the user, that is, "basketball", "law", and "music" may be used as the point of interest of the user. Scopes of the types may be determined according to a preset policy.

A second manner is: separately performing word segmentation and stop word removal on the following information: information posted by the target user, information favorited by the target user, information reposted by the target user, and information commented on by the target user, and the like; and then, performing semantic clustering on each word, and determining the point of interest of the target user by using a clustering result.

For example, when such words as "Yao Ming", "Kobe", and "takers" occur frequently in posted information, favorited information, reposted information, or comment information of a user in a microblog, these words are clustered as one type after semantic clustering is performed. This type is corresponding to a basketball type, and therefore, it may be determined that the point of interest of the target user is "basketball".

Step 203: Determine, by using a seed user related to the point of interest of the target user, a quality user corresponding to the point of interest that is of the target user and in the social media.

This step is actually a process of discovering a quality user by using a seed user. The seed user is generally preset, for example, a seed user related to a point of interest "IT" may be set as "Kai Fu Lee", a seed user related to a point of interest "movie and television" may be set as "Yao Chen", and a seed user related to a point of interest "basketball" may be set as "Yu Jia". The seed user is generally a user who has relatively great impact in the industry of the user in a social media.

When a quality user corresponding to a point of interest is determined, a user whose score meets a preset requirement is selected from a user who has an association relationship with the seed user related to the point of interest, as the quality user. The association relationship may include but is not limited to a following relationship, a follower relationship, a comment relationship, a reposting relationship, and the like.

A score for a user is determined according to, without limitation to, the following factors: a degree of content matching between information that is posted, reposted, or self-described by the user and the point of interest, an activity degree of the user, impact of the user, a spread range of user information, and the like. A higher matching degree indicates a higher score, a higher activity degree of the user indicates a higher score, greater impact indicates a higher score, and a larger spread range of user information indicates a higher score. The activity degree of the user may be determined according to one of or any combination of the following factors: a frequency of logging in to a social media by the user, time of logging in to the social media, a quantity of posted information, a quantity of reposted information, a quantity of comment information, and the like; impact of the user may be determined according to a quantity of followers of the user, a level of the user, and the like; and the spread range of user information may be determined according to one of or a combination of the following factors: reposting times, commenting times, favoriting times, and the like of the user information.

Step 204: Select information related to the point of interest from historical operation information of the quality user corresponding to the point of interest of the target user, and use the selected information as an annotated corpus of the point of interest.

In this step, semantic similarity between a point of interest and posted information, favorited information, reposted information, and comment information of a quality user corresponding to the point of interest is computed, and information whose semantic similarity meets a preset similarity requirement is selected as information related to the point of interest. In addition, an operation attribute of the information related to the point of interest may be further annotated, that is, posted original information, comment information, reposted information, favorited information, or the like.

Step 205: Train an interest classification model of the target user by using the annotated corpus as a training sample.

When the interest classification model is trained, a used feature mainly includes a keyword of information, or may further include but is not limited to one of or any combination of the following factors: an information poster, a person followed by the information poster or a follower of the information poster, a quantity of comments on information, a quantity of reposts of information, a quantity of favorites of information, and the like. The classification model training uses a relatively mature technology.

So far, an off-line process for training the interest classification model of the target user ends. The on-line information recommendation procedure includes the following steps:

Step 211: Acquire real-time information of the social media.

A purpose of this embodiment of the present invention is mainly to implement recommendation of real-time information, and therefore, in this step, real-time information of the social media is preferably acquired as to-be-recommended information for recommendation. Certainly, another type of information may also be used for recommendation, for example, notification information and promotion information.

Step 212: Input the real-time information to the interest classification model of the target user, so as to determine whether the real-time information tallies with an interest of the target user.

After the real-time information is input to the interest classification model of the target user, a feature in the real-time information is analyzed. If the feature is consistent with a feature that is used when the interest classification model is trained, a classification result finally obtained is whether the real-time information tallies with the interest of the target user.

Step 213: If the real-time information tallies with the interest of the target user, recommend the real-time information to the target user.

Generally, because the interest classification model is established for each user separately when on-line matching is performed, the real-time information needs to be input to the interest classification model of each user separately, to separately determine whether the real-time information tallies with an interest of each user, and the real-time information is finally recommended to a user that is interested in the real-time information.

For example, when there is a microblog about "basketball" recently posted in the social media, the microblog is input to the interest classification model of each user. A classification result of an interest classification model corresponding to a user who is interested in basketball is that the microblog tallies with a user interest, and then, the microblog about "basketball" can be recommended to a user who tallies with the user interest.

In this embodiment of the present invention, a manner for recommending the real-time information to the target user is not limited, and only several examples are enumerated herein. For example, real-time information that tallies with the interest of the target user may be recommended to the target user in a client manner, or real-time information that is recommended to the target user may be presented in a fixed area of a user interface in the social media, or real-time information may be recommended to the target user in a manner of periodically sending e-mails.

Figure 3:
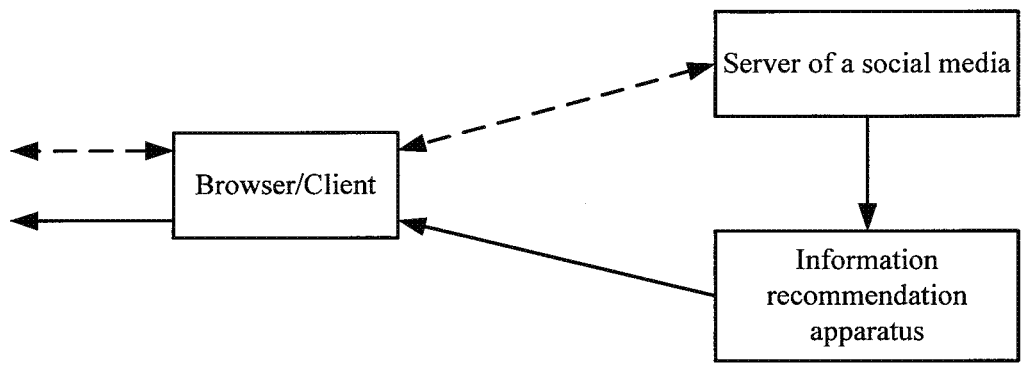
FIG. 3 is a system architecture diagram according to an embodiment of the present invention.

The foregoing describes the method provided in this embodiment of the present invention in detail. The method is executed by an information recommendation apparatus provided in this embodiment of the present invention, where the information recommendation apparatus is disposed on a server end of the social media. In an off-line procedure, historical operation information of a target user and historical operation information of a quality user are acquired from the server end of the social media to establish an interest classification model of the target user; and in an on-line procedure, to-be-recommended information is acquired from the server end of the social media, the to-be-recommended information is recommended to the target user who is interested in the to-be-recommended information, and is presented to the target user by using a client, a browser, or the like. A system architecture is shown in FIG. 3.

Figure 4:
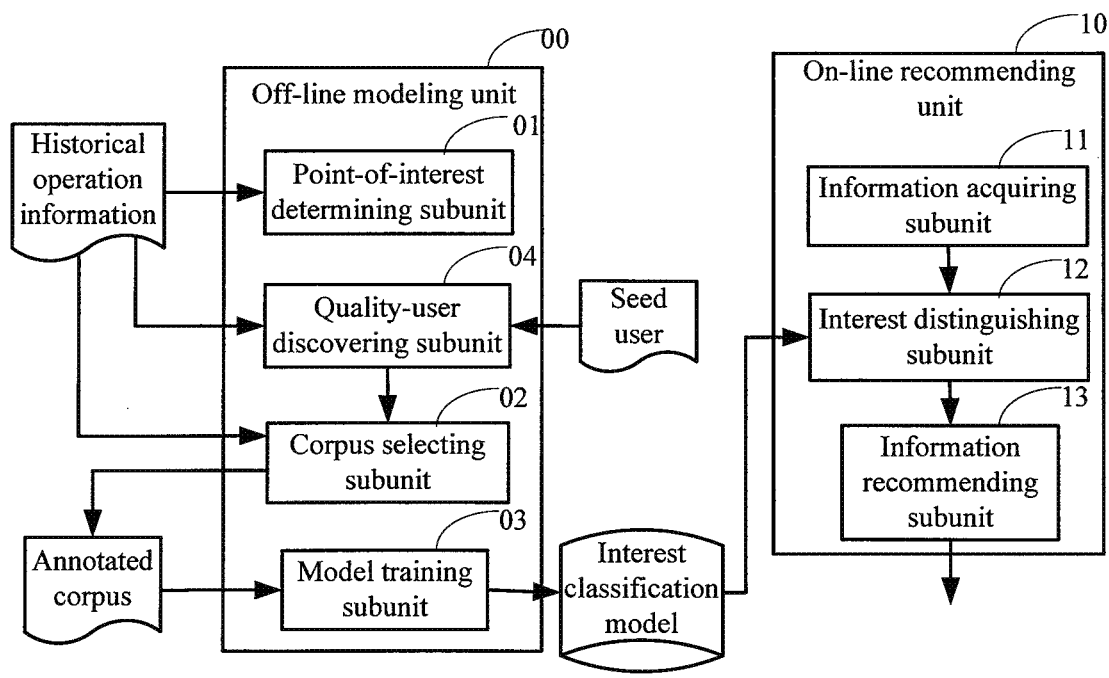
FIG. 4 is a structural diagram of an information recommendation apparatus according to an embodiment of the present invention.

FIG. 4 is a structural diagram of an information recommendation apparatus according to an embodiment of the present invention. The information recommendation apparatus may be disposed on a server of a social media, or may be disposed on a device that is on a network side and is independent of a server of a social media. As shown in FIG. 4, the information recommendation apparatus includes an off-line modeling unit 00 and an on-line recommending unit 10, where the off-line modeling unit 00 is configured to complete an off-line procedure, and the on-line recommendation unit 10 is configured to complete an on-line procedure.

Specifically, the off-line modeling unit 00 includes a point-of-interest determining subunit 01, a corpus selecting subunit 02, and a model training subunit 03.

The point-of-interest determining subunit 01 is configured to determine a point of interest of a target user from historical operation information that is of the target user and in a social media. In this embodiment of the present invention, the target user may be a designated user in the social media, or may be all users in the social media.

The historical operation information of the target user may be acquired from a server end of the social media by using an API provided by the social media. The historical operation information may include but is not limited to information posted by the target user, information favorited by the target user, information reposted by the target user, information commented on by the target user, a tag annotated by the target user, and the like.

When the point of interest of the target user is determined, the point-of-interest determining subunit 01 may specifically use, without limitation to, the following two manners:

A first manner is: determining the point of interest of the user by using a tag that is annotated in the social media by the target user.

A second manner is: after word segmentation and stop word removal are separately performed on at least one type of the following information: posted information, favorited information, reposted information, and comment information of the target user, performing semantic clustering on an obtained word, and determining the point of interest of the target user by using a clustering result.

The corpus selecting subunit 02 is configured to select information related to the point of interest from historical operation information that is of a quality user related to the point of interest and in the social media, as an annotated corpus. A seed user is generally preset and is generally a user who has relatively great impact in the industry of the user in the social media.

When the information related to the point of interest is selected, the corpus selection subunit 02 may be specifically configured to: compute semantic similarity between the point of interest and each piece of information in the historical operation information of the quality user corresponding to the point of interest, and select information whose semantic similarity meets a preset similarity requirement as the information related to the point of interest. In addition, an operation attribute of the information related to the point of interest may be further annotated, that is, posted original information, comment information, reposted information, favorited information, or the like.

The model training subunit 03 is configured to train an interest classification model of the target user by using the annotated corpus as a training sample.

When the model training subunit trains the interest classification model, a used feature includes a keyword of information, or further includes one of or any combination of the following factors: an information poster, a person followed by the information poster and a follower of the information poster, a quantity of comments on information, a quantity of reposts of information, and a quantity of favorites of information.

In addition, to implement selection of a quality user, the off-line modeling unit 00 may further include a quality-user discovering subunit 04. The quality-user discovering subunit 04 selects a user whose score meets a preset requirement from a user who has an association relationship with the seed user related to the point of interest, as a quality user. The association relationship may include but is not limited to a following relationship, a follower relationship, a comment relationship, a reposting relationship, and the like. A score for a user may be determined according to one of or any combination of the following factors: a degree of content matching between information that is posted, reposted, or self-described by the user and the point of interest, an activity degree of the user, impact of the user, and a spread range of user information. A higher matching degree indicates a higher score, a higher activity degree of the user indicates a higher score, greater impact indicates a higher score, and a larger spread scope of the user information indicates a higher score. The activity degree of the user may be determined according to one of or any combination of the following factors: a frequency of logging in to a social media by the user, time of logging in to the social media, a quantity of posted information, a quantity of reposted information, a quantity of comment information, and the like; impact of the user may be determined according to a quantity of followers of the user, a level of the user, and the like; and the spread range of the user information may be determined according to one of or a combination of the following factors: reposting times, commenting times, favoriting times of the user information, and the like.

The on-line recommending unit 10 includes an information acquiring subunit 11, an interest distinguishing subunit 12, and an information recommending subunit 13.

The information acquiring subunit 11 is configured to acquire to-be-recommended information of the social media, where the to-be-recommended information herein is mainly real-time information of the social media, or may be notification information, promotion information, or the like.

The interest distinguishing subunit 12 is configured to: input the to-be-recommended information to the interest classification model of the target user, so as to determine whether the to-be-recommended information tallies with an interest of the target user; after the real-time information is input to the interest classification model of the target user, analyze a feature in the real-time information, where if the feature is consistent with a feature that is used when the interest classification model is trained, a classification result finally obtained is whether the real-time information tallies with the interest of the target user.

If the interest distinguishing subunit 12 determines that the to-be-recommended information tallies with the interest of the target user, the information recommending subunit 13 recommends the to-be-recommended information to the target user. In this embodiment of the present invention, a manner for recommending the real-time information to the target user is not limited, and only several examples are enumerated herein. For example, the real-time information that tallies with the interest of the target user may be recommended to the target user in a client manner, or the real-time information that is recommended to the target user may be presented in a fixed area of a user interface in the social media, or the real-time information may be recommended to the target user in a manner of periodically sending e-mails.

The social media involved in the embodiments of the present invention includes a blog, a light blog, a microblog, a forum, a social website, and the like.

In the several embodiments provided in the present invention, it should be understood that the disclosed system, apparatus, and method may be implemented in other manners. For example, the apparatus embodiment described above is merely exemplary, for example, the division of the units is merely performed according to logical functions and may be other division in actual implementation.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor (processor) to perform some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. An information recommendation method in a social media, the method comprising:
   in an off-line procedure:
      determining a point of interest of a target user from historical operation information that is of the target user and in the social media, wherein the historical operation information is online activity information conducted by the target user in the social media,
      selecting information related to the point of interest from historical operation information that is of a quality user related to the point of interest and in the social media, as an annotated corpus,
      selecting a first user having a score that meets a preset requirement from a second user that has an association relationship with we predetermined seed user related to the point of interest as the quality user, and
      training an interest classification model of the target user by using the annotated corpus as a training sample; and
   in an on-line procedure:
      acquiring to-be-recommended information of the social media,
      inputting the to-be-recommended information to the interest classification model of the target user, for determining whether the to-be-recommended information corresponds with an interest of the target user, and
      if the to-be-recommended information corresponds with the interest of the target user, recommending the to-be-recommended information to the target user.

2. The method according to claim 1, wherein the historical operation information comprises at least one type of a following information:
   posted information, favorited information, reposted information, comment information, and an annotated tag.

3. The method according to claim 2, wherein determining a point of interest of a target user from historical operation information that is of the target user and in the social media, comprises:
   determining the point of interest of the target user by using a tag that is annotated in the social media by the target user.

4. The method according to claim 2, wherein determining a point of interest of a target user from historical operation information that is of the target user and in the social media, comprises:
   after word segmentation and stop word removal are separately performed on at least one type of the following information: posted information, favorited information, reposted information, and comment information of the target user, performing semantic clustering on an obtained word, and determining the point of interest of the target user by using a clustering result.

5. The method according to claim 1,
   wherein the score is determined according to one of or any combination of the following factors:
      a degree of content matching between information that is posted, reposted, or self-described by the first user and the point of interest, an activity degree of the user, impact of the user, and a spread range of user information.

6. The method according to claim 1, wherein selecting information related to the point of interest from historical operation information that is of a quality user related to the point of interest and in the social media, as an annotated corpus, comprises:
   computing semantic similarity between the point of interest and each piece of information in the historical operation information of the quality user corresponding to the point of interest, and
   selecting information whose semantic similarity meets a preset similarity requirement as the information related to the point of interest.

7. The method according to claim 1, wherein when the interest classification model is trained, a used feature comprises a keyword of information.

8. The method according to claim 7, wherein when the interest classification model is trained, the used feature further comprises one of or any combination of the following factors:
   an information poster, a person followed by the information poster or a follower of the information poster, a quantity of comments on information, a quantity of reposts of information, and a quantity of favorites of information.

9. The method according to claim 1, wherein the to-be-recommended information is real-time information, notification information, or promotion information.

10. A computer system, comprising:
    a non-transitory memory and a processor, wherein the non-transitory memory stores instructions which when executed by the processor cause the processor to:
    in an off-line procedure:
       determine a point of interest of a target user from historical operation information that is of the target user and in a social media, wherein the historical operation information is online activity information conducted by the target user in the social media,
       select information related to the point of interest from historical operation information that is of a quality user related to the point of interest and in the social media, as an annotated corpus,
       select a first user having a score that meets a preset requirement from a second user that has an association relationship with a predetermined seed user related to the point of interest, as the quality user, and
       train an interest classification model of the target user by using the annotated corpus as a training sample; and
    in an on-line procedure:
       acquire to-be-recommended information of the social media,
       input the to-be-recommended information to the interest classification model of the target user, for determining whether the to-be-recommended information corresponds with an interest of the target user, and
       if the to-be-recommended information corresponds with the interest of the target user, recommend the to-be-recommended information to the target user.

11. The computer system according to claim 10, wherein the historical operation information comprises at least one type of a following information:

posted information, favorited information, reposted information, comment information, and an annotated tag.

12. The computer system according to claim 11, wherein the instructions further cause the processor to:
determine the point of interest of the target user by using a tag that is annotated in the social media by the target user.

13. The computer system according to claim 11, wherein the instructions further cause the processor to:
perform semantic clustering on an obtained word after word segmentation and stop word removal are separately performed on at least one type of the following information: posted information, favorited information, reposted information, and comment information of the target user, and
determining the point of interest of the target user by using a clustering result.

14. The computer system according to claim 10, wherein the instructions further cause the processor to determine the quality user related to the point of interest.

15. The computer system according to claim 14,
wherein the score is determined according to one of or any combination of the following factors:
a degree of content matching between information that is posted, reposted, or self-described by the first user and the point of interest, an activity degree of the user, impact of the user, and a spread range of user information.

16. The computer system according to claim 10, wherein the instructions further cause the processor to:
compute semantic similarity between the point of interest and each piece of information in the historical operation information of the quality user corresponding to the point of interest, and
select information whose semantic similarity meets a preset similarity requirement as the information related to the point of interest.

17. The computer system according to claim 10, wherein when the interest classification model is trained, a used feature comprises a keyword of information.

18. The computer system according to claim 17, wherein when the interest classification model is trained, the used feature further comprises one of or any combination of the following factors: an information poster, a person followed by the information poster or a follower of the information poster, a quantity of comments on information, a quantity of reposts of information, and a quantity of favorites of information.

19. The computer system according to claim 10, wherein the to-be-recommended information is real-time information, notification information, or promotion information.

* * * * *

UNITED STATES PATENT AND TRADEMARK OFFICE
CERTIFICATE OF CORRECTION

PATENT NO. : 10,810,499 B2
APPLICATION NO. : 14/991651
DATED : October 20, 2020
INVENTOR(S) : Jie Zhang, Yibo Zhang and Hang Li It is certified that error appears in the above-identified patent and that said Letters Patent is hereby corrected as shown below:

In the Claims

In Claim 1, Column 11, Line 26, delete "with we predetermined" and insert --with a predetermined--.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*